Patented Nov. 2, 1943

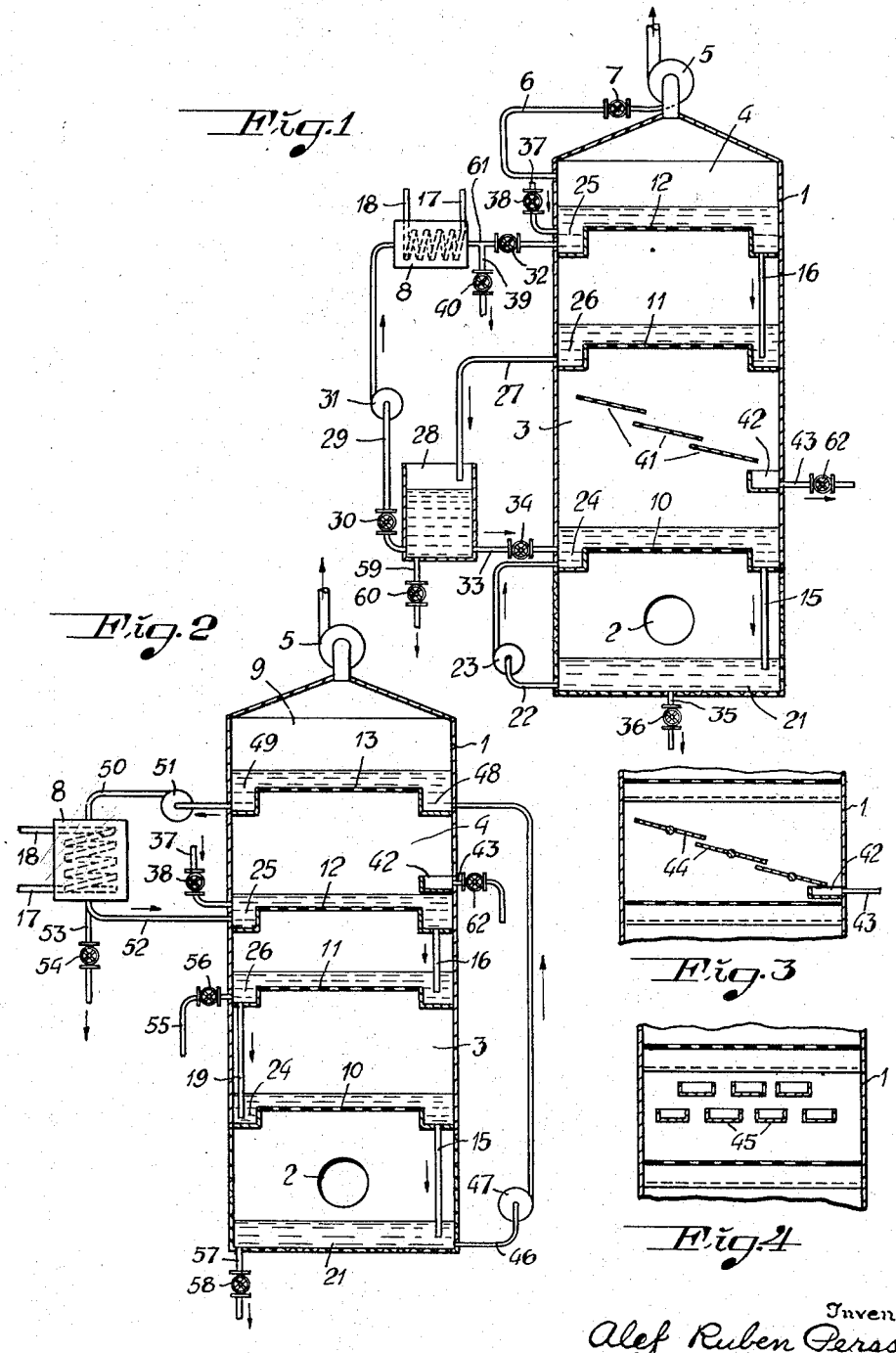

2,333,193

UNITED STATES PATENT OFFICE 2,333,193

METHOD FOR RECOVERING SUBSTANCES CONTAINED IN GASES

Alef Ruben Persson, Hedemora, and Johan Olof Nauclér, Stocksund, Sweden

Application March 4, 1940, Serial No. 322,228
In Sweden April 22, 1939

1 Claim. (Cl. 183—120)

This invention relates to a method for recovering solid, liquid and/or gaseous or vaporous substances contained in gases and relates more specifically to recovering sodium sulphate and other sodium compounds contained in flue gases from the combustion of black liquor of the sulphate process for the manufacture of cellulose pulp.

In the process of this invention the gases to be treated are brought into contact with a liquid so as more or less to saturate said gases with a condensable gas or vapour and subsequently to subject said gases to condensation through direct or indirect heat exchange whereby to cause said condensable gas or vapour together with condensable components of the initial gas to condense upon particles present in the gas to be treated and thus to increase the size of such particles so as to facilitate the separation thereof and also to assist in dissolving gaseous recoverable substances in the condensate formed.

It is an object of this invention to provide a method which is very economical in use as well as an apparatus which is simple in construction by which it is possible to obtain valuable substances carried by fixed gases, particularly solids entrained by such gases, in the form of a relatively concentrated solution.

Another object is to use for said saturation and said condensation a liquid consisting of condensate formed in the process.

Another object is to add to the liquid of the condensation stage an alkaline substance, preferably a hydroxide or a carbonate or an alkaline salt, containing the same positive ion as that of the substances to be recovered.

Still another object is in recovering said substances also to recover heat from said gases.

For a better understanding of the nature of the invention together with further objects and advantages, details and combinations of features and parts as well as the manner in which it is carried into effect, reference may be had to the accompanying drawing forming a part of this specification and to the following description thereof.

In the drawing:

Fig. 1 illustrates, partly in section, an apparatus according to the invention;

Fig. 2 illustrates, also partly in section, a modification of the apparatus according to the invention;

Figs. 3 and 4 show specific embodiments of a detail for preventing process liquids mixing with each other.

Referring first to Fig. 1, I indicates a container forming a column in which a plurality of perforated plates 10, 11, 12 are arranged above each other. At the lower perforated plate 10 the gas introduced through the gas inlet 2, preferably in hot condition, will be substantially completely saturated by direct contact with a liquid disposed on said perforated plate 10. This device for saturating gas will be referred to as a saturator. Through passage 3 the saturated gas passes to another perforated plate 11 and is there contacted with a cooler liquid disposed above said perforated plate 11 whereby a part of its vapour content corresponding to the temperatures of the saturating and the last-named liquids will be condensed with the effect that the temperature of the gas will decrease and that of the liquid increase. Upon leaving this contact the gas passes to the uppermost perforated plate 12 and is there caused to pass through a still cooler liquid streaming over said plate 12. By the contact with this liquid further vapour will be condensed so as further to cool said gas and to heat the liquid correspondingly. The perforated plates 11 and 12 constitute the condensation stage and will be referred to as the condenser where the gas gives off heat and vapour (steam) as well as solid, liquid and gaseous components present therein. The gas leaving said condensation stage will be discharged by the ventilator 5 through the gas outlet 4 of the condensation stage. Entrained liquid drops which may contain substances to be recovered from the gas are separated to a great degree in this ventilator and are withdrawn therefrom through conduit 6 containing valve 7 to be returned to the condensation stage or to any other place as desired.

The saturating liquid is circulated over the perforated plate 10, through conduit 15 to the receptacle 21 and from there back to the saturator plate 10 through conduit 22 by means of pump 23 and reaches the saturator at 24.

The liquid of the condensation stage enters said stage above the uppermost perforated plate 12 at 25, passes over this plate and leaves through the conduit 16 which discharges the liquid at the one side of the lower perforated plate 11 of the condensation stage over which the liquid passes and leaves at 26 through conduit 27 to be collected in receptacle 28. From this receptacle the liquid is pumped through conduit 29 containing valve 30 by means of pump 31 to a heat exchanger 8 where heat taken up by the liquid in the condenser will be transmitted to a cooling fluid supplied through conduit 17 and withdrawn through conduit 18. From said heat exchanger 8 the liquid will be returned through a conduit 61 containing valve 32 to the upper perforated plate 12 of the condensation stage at 25.

Although in both the saturating and the condensing circulation system receptacles 21 and 28, respectively, are shown in the drawing, such receptacles may be omitted.

The liquid evaporated in the saturating stage and taken up by the gas in a vaporous state will be replaced by fresh liquid which, perferably continuously, is supplied from the condensing stage and, as shown in the drawing, we prefer to supply it from the receptacle 28, through the conduit 33 and valve 34. A regulated amount of relatively concentrated solution being the desired concentrated product of the process is withdrawn from the saturating stage preferably as shown through discharge conduit 35 containing valve 36 and being attached to the receptacle 21. The amount of liquid supplied from the condenser system through the conduit 33 should be sufficient to compensate also for the amount of liquid thus withdrawn.

Depending on the content of vapour corresponding to the liquid employed in the system of the initial gas to be treated said gas will either take up or give off vapour in the system or leave the system without taking up or giving off vapour. Now, as described above, a certain amount of liquid containing the substances separated from the gas will be withdrawn from the total system either in the saturator or in the condenser or in both. The liquid thus withdrawn may be compensated for by condensate from the fresh gas formed when passing the total system but in case the condensate thus formed is not sufficient fresh liquid may be supplied to the condensation stage from an outer source. In Fig. 1 conduit 37 containing valve 38 is provided for supplying such liquid to the system. On the other hand, the amount of condensate formed in the total system from the fresh gas may be excessive of that required for the relatively concentrated liquid withdrawn as the desired product. In this case excess liquid will be withdrawn as a regulated amount of condensate liquid, which takes place in the apparatus shown in Fig. 1 through conduit 39 and valve 40 or, if desired, through conduit 59 and valve 60. Liquid may be supplied or withdrawn also from other points in the circulation systems for saturating liquid and a condensing liquid, but the points shown are preferred.

As long as the ventilator 5 is working and gas flows through the system liquid will flow over the various perforated plates substantially without penetrating said plates. When the apparatus, however, is stopped or the flow of gas through the apparatus otherwise ceases or is reduced to a certain degree, the liquid present above the perforated plates will run off through the perforations thereof to another perforated plate, if any, therebelow and finally be collected at the bottom of the container. It is important, however, that the diluted liquid of the condenser system shall not mix with the relatively concentrated liquid of the saturating system. Therefore, in the passage 3 between saturator and condenser three sloping overlapping plates 41 are provided so as to direct liquid leaking from the condenser to a collection receptacle 42 from which the leakage is withdrawn through conduit 43 containing valve 62 to be returned to the condenser system, for instance to the receptacle 28, by means of a suitable conduit not shown in the drawing. Instead of these immovable plates damper-like plates 44, as shown in Fig. 3, may be employed. By turning the plates 44 into a vertical position the resistance to flow of gas will be considerably reduced. It is also possible to provide a plurality of troughs 45 preferably sloping in the longitudinal direction thereof and arranged in relation to each other in principle as shown in Fig. 4.

Although in Fig. 1 the saturator and the condenser are equipped with one and two perforated plates, respectively, these numbers are not restrictive, but, without departing from the scope of our invention, the number thereof may be varied in accordance with special requirements. Neither is the number of plates 41 or 44 or that of troughs 45 limited to that mentioned or shown in the figures. The more thereof the better is the distribution of the gas for the stage thereabove.

In the embodiment shown in Fig. 2, as in that shown in Fig. 1, plates 10, 11 and 12 are provided in a container 1 and similarly the perforated plate 10 constitutes the saturating stage and the plates 11 and 12 the condensing stage. In the container 1 a further perforated plate 13 constituting the so-called evaporating stage and referred to as the evaporator is disposed above the condensation stage. Just as described with reference to Fig. 1, the gas to be treated enters through gas inlet 2, passes the saturator plate 10, the gas conduit 3 and the condenser plates 11 and 12 from where it passes through the gas discharge conduit 4 of the condenser stage to the evaporation stage and passes through the evaporator plate 13 and the liquid disposed thereabove and is finally withdrawn by means of ventilator 5 through space 9. The liquid streaming over the saturator plate 10 passes through conduit 15 to receptacle 21 from where it is taken through conduit 46 by pump 47 to the evaporator and enters the same at 48. Having passed the evaporator plate 13 it leaves at 49 through conduit 50 and is pumped by pump 51 through heat exchanger 8. From this heat exchanger 8 the liquid is passed through conduit 52 to the condenser which it enters at 25, passes the perforated plate 12, flows through conduit 16 to the one side of the perforated plate 11, passes over plate 11 and flows through conduit 19 back to the saturator which it enters at 24.

A regulated quantity of relatively concentrated solution constituting the desired product is withdrawn through conduit 53 and valve 54. As described in connection with Fig. 1 and under the same conditions, liquid may be supplied to the system through a conduit 37 containing valve 38, or a regulated amount of diluted solution may be withdrawn from the condensing stage through conduit 55 and valve 56. The description of supplying and withdrawing liquids to the system with reference to the apparatus shown in Fig. 1 applies as well to the apparatus shown in Fig. 2.

Similarly devices 41, 44 or 45 preventing leakage may also be provided in the apparatus shown in Fig. 2, although they are of less importance in this case, since the difference in concentration of the different stages is not so great in this case. Neither are the numbers of perforated plates of the various stages limited to those shown in the figure. At the bottom of container 21 a drain conduit 57 containing valve 58 is provided. In some cases we prefer to provide a receptacle also immediately after the evaporation stage, for instance for eliminating incidental fluctuations in the process and preventing the pump 51 from emptying the evaporation stage.

The method and apparatus shown in Figs. 1–2 may be modified considerably without departing from the scope of the invention. Thus, in the apparatus shown in Fig. 1, the saturator may be omitted and an evaporator arranged after the condenser. Also in the apparatus shown in Fig. 2 the saturator may be omitted. In both cases first saturation and then condensation will take place in the condenser, which is also possible even if only one perforated plate be provided in this stage. In both cases liquid withdrawn from the condenser will be recontacted with the gas in the evaporator.

It is to be understood that any type of heat exchangers may be employed for that indicated by reference numeral 8 without departing from the scope of the invention. For instance, we may employ a heat exchanger based upon the principle of cooling by blowing a gas, such as air, through the liquid to be cooled whereby also a further evaporation of the liquid will be attained. As a cooling fluid we may use any liquid being sufficiently cool and we prefer to employ a liquid which is to be heated so as to utilize the heat extracted from the gas for a useful purpose.

The temperature of the gases to be treated being usually relatively high, the parts of the apparatus coming into direct contact with the gases below the lowermost perforated plate 10 should be made from heat resistant material. The parts above said plate may be made from other materials, such as wood.

For effecting the direct contact between gas and liquid any adequate device may be used, such as a spraying device, but we prefer to use perforated plates as shown and particularly in the manner disclosed in U. S. Patent No. 1,958,383.

Although not shown in Fig. 1, the apparatus may also be modified to the effect that an evaporating stage will be arranged after the condensator in a way similar to that shown in Fig. 2. In such an arrangement we prefer to supply said evaporator with liquid withdrawn from the saturator as a desired product of the process. In this manner the resulting final solution will be still more concentrated. Also in this case a receptacle may be provided in the conduit leading from the evaporator.

In the drawing and in the detailed above description we have shown the various treating stages one above the other in a column. It is, however, within the scope of the invention to arrange one or more of said stages in separate containers at any level in relation to each other, but the various gas and liquid connections must be arranged principally as shown. For the proper circulation of liquids, pumps may have to be provided at other points than those shown in the figure, since in separate containers the various stages may be arranged on level with each other or in any order at different levels above each other.

To illustrate a mode of working of the apparatus shown in Fig. 1, the gas supplied and to be treated with water according to the present invention, such as flue gas, may have a temperature of for instance 200° C. and a dew point of say 53° C. In the saturator the gas will be cooled and saturated at for instance 60° C. This saturated 60 degrees flue gas will be brought into contact in the condenser with the cooler condenser liquid and by the intimate contact with this liquid the gas will be cooled say to 40° C., water vapour being condensed from the gas corresponding to the difference in water content of saturated gas at 60° C. and at 40° C. In this case the flue gas will give off in the passage through the total apparatus (saturator and condenser) a considerable amount of water vapour in the form of condensate corresponding to the difference in water content of saturated flue gas at 53° C. and at 40° C. By suitably controlling these temperatures the water supplied through condensation may be completely sufficient to provide the system with liquid. Generally, in such cases the process liquids consist entirely of condensate from the initial gas supplied. Turning now to the concentrations of the process liquids, it has been assumed that the flue gas gives off water when passing the apparatus. This apparatus when properly run will deliver a relatively concentrated solution from the saturator and the excess of condensate has to be withdrawn from the condenser in the form of a correspondingly weak diluted solution. The solution withdrawn from the saturator may contain, for instance, 25% of a certain substance or certain substances extracted from the gases, whereas that withdrawn from the condenser may hold 10%. Now, however, we may again apply the method according to this invention so as to recover even the solution withdrawn from the condenser as a strong solution (for instance, holding 25%) by treating it in an evaporation stage with the gas leaving the condenser, i. e., by providing above plate 12 for instance one or more perforated plates (corresponding to plate 13 of Fig. 2) to be connected with conduit 59 or possibly conduit 39. Thus, all liquid is withdrawn as a more or less concentrated solution.

Since the gases leaving the condensation stage and supplied to the evaporation stage are comparatively cool, the liquid supplied to the latter stage should be hot so as to secure an effective evaporation. Particularly when using condenser liquid it may be practical to heat the liquid prior to being charged to the evaporator.

The method and the apparatus according to this invention may at great advantage be applied in cellulose manufacture especially in connection with the evaporation and combustion of waste liquors obtained therein. In the combustion of black liquor in the soda furnace a flue gas relatively rich in water vapour is formed. In addition to usual combustion products, amongst which in this connection sulphur dioxide may be especially pointed out, this flue gas also contains entrained solid valuable particles of sodium compounds, particularly sodium sulphate. It is the object of the invention in this case to recover these sodium compounds and part of the heat content of the flue gases which usually have been utilized for steam generating in a steam boiler and the like. Such flue gases mostly containing an excess amount of acid components, we prefer to make the liquid of the condensation stage alkaline as by NaOH or $Na_2CO_3$, the same preferably being added to the solution in the form of white liquor or raw liquor or any alkaline wash liquid of the cellulose process.

While in the foregoing description we have considered specific embodiments and various details of our invention, it is to be understood that our said invention is not confined thereto but is to be understood in its broadest aspects.

What we claim is:

A method for recovering, in the form of a concentrated solution, substances suspended in gases containing vapours of a solvent for said substances, comprising the steps of substantially saturating said gases in a first stage with vapours of said solvent by direct contact with a liquid containing said solvent under such conditions as to effect evaporation of the latter, subjecting the saturated gases in a second stage to condensation by direct contact with a similar liquid consisting substantially of condensates from said gases and having a lower temperature than the liquid of said first stage, cooling said liquid of said second stage and circulating it between the cooling stage and said second stage, feeding to said first stage only so much liquid from said second stage as can be concentrated to the desired degree as a result of the evaporation which accompanies saturation of said gases in said first stage, drawing off from said first stage liquid so concentrated to the desired degree, and drawing off from said second stage a quantity of liquid substantially equal to the excess of the quantity of condensate produced from said gases over the quantity of liquid which is fed from said second stage to said first stage.

ALEF RUBEN PERSSON.
JOHAN OLOF NAUCLÉR.